United States Patent Office 2,993,890
Patented July 25, 1961

2,993,890
β-SUBSTITUTED INDOLES

Seymour L. Shapiro, Hastings on Hudson, and Louis Freedman, Bronxville, N.Y., assignors to U.S. Vitamin and Pharmaceutical Corporation, New York, N.Y., a corporation of Delaware
No Drawing. Filed June 27, 1960, Ser. No. 38,727
6 Claims. (Cl. 260—240)

This invention is concerned with novel organic compounds and more particularly, with indole derivatives of the class β-(5-[substituted phenyl]-penta-4-ene-3-one)-indole which may be represented by the formula

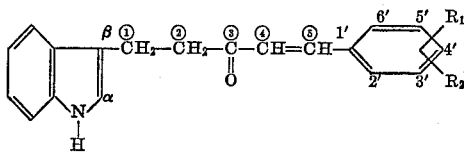

wherein $R_1$ and $R_2$ represent substituents on the benzene ring such as hydrogen, halogen, hydroxy, alkoxy, alkyl, acetamido, and those structures wherein $R_1$ plus $R_2$ represent methylenedioxy.

It is the object of the present invention to prepare novel compounds of the class β-(5-[substituted phenyl]penta-4-ene-3-one)indoles. It is a further object of the invention to provide a novel process for the preparation of such β-indoles. Other objects of the invention will be apparent to one skilled in the art to which the invention pertains.

The compounds of this invention are of a particular importance as intermediates in the preparation of compounds of the type shown by reaction with amines XYNH

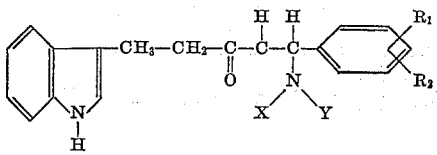

which are tyramine-adrenaline-like congeners of important pharmacological potential. The compounds per se also have anti-inflammatory action.

In the preparation of the β-(5-[substituted phenyl]-penta-4-ene-3-one)indoles, the appropriately substituted aromatic aldehyde is reacted with 1-(β-indoyl)-butane-3-one, a reactant which is prepared according to J. Szmuszkovicz, J. Am. Chem Soc., 79, 2819 (1957). The condensation is preferably carried out in an organic solvent such as a lower alcohol, suitably methanol, in the presence of sodium methoxide as a alkaline condensing agent. Other alkaline condensing agents such as alkali metal alkoxides and hydroxides may be employed. The reaction proceeds satisfactorily at room temperature and the reaction mixture may be permitted to merely stand, preferably in the dark, at room temperature for several hours up to seven days until the reaction is complete.

An equation typifying the reaction is shown below.

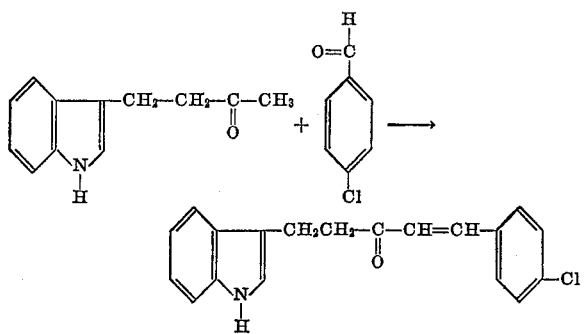

The compounds of the present invention can exist in cis and trans forms as shown, for example, below.

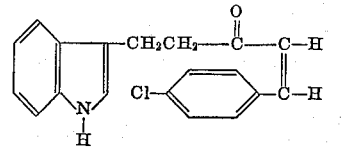
cis

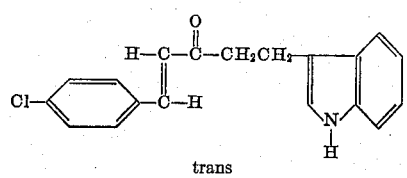
trans

While our experimental findings have not clearly indicated the stereo-isomer which is formed, it is intended that both forms, the cis and trans be within the purview of this invention.

The invention will be further illustrated by description in connection with the following specific examples showing preparations of compounds of the invention. All temperatures are expressed as ° C.

Example 1

A mixture of 1.87 g. (0.01 mole) of 1-(β-indolyl)-butane-3-one and 1.36 g. (0.01 mole) of anisaldehyde in 10 ml. of methanol was treated with 1.25 ml. of 25% sodium methylate in methanol. After 20 hours, the crystalline product, 1.8 g. of β-(5-[p-methoxyphenyl]penta-4-ene-3-one)indole was separated, M.P. 138–139° (methanol).

*Analysis.*—Calcd. for $C_{20}H_{19}NO_2$: C, 78.7; H, 6.3; N, 4.6. Found: C, 78.9; H, 6.1; N, 5.1.

Example 2

In a similar manner to that used in Example 1, substituting benzaldehyde as the aromatic aldehyde, using a 0.01 mole run, there was obtained 1.6 g. of β-(5-phenyl-penta-4-ene-3-one)indole, M.P. 130–131° (methanol).

*Analysis.*—Calcd. for $C_{19}H_{17}NO$: C, 82.9; H, 6.2; N, 5.1. Found: C, 83.2; H, 6.2; N, 5.0.

Example 3

In a manner similar to that used in Example 1, substituting piperonal as the aromatic aldehyde, using a 0.01 mole run, there was obtained 1.7 g. of β-(5-[3',4'-methylenedioxyphenyl]penta-4-ene-3-one)indole, M.P. 167–168° (methanol).

*Analysis.*—Calcd. for $C_{20}H_{17}NO_3$: N, 4.4. Found: N, 4.5.

By dilution of the filtrate of the initial reaction mixture with 20 ml. of water there was obtained an additional 1.2 g. of the product.

Example 4

A mixture of 1.87 g. (0.01 mole) of 1-(β-indolyl)-butane-3-one and 1.63 g. (0.01 mole) of p-acetamidobenzaldehyde was dissolved in 18 ml. of methanol by warming. When cool, 1.25 ml. of 25% sodium methoxide in methanol was added. After 24 hours the reaction mixture was diluted with 100 ml. of water containing 0.3 ml. of glacial acetic acid. The orange crystalline product, 3.0 g. of β-(5-[p-acetamidophenyl]penta-4-ene-3-one)-indole was separated, M.P. 218–224° (methyl Cellosolve).

Example 5

In a manner similar to that used in Example 4, substituting 2,3-dimethoxybenzaldehyde as the aromatic aldehyde, there was obtained β-(5-[2',3'-dimethoxyphenyl]-penta-4-ene-3-one)indole as a waxy solid.

Example 6

A mixture of 1.87 g. (0.01 mole) of 1-(β-indolyl)-butane-3-one and 1.22 g. (0.01 mole) of m-hydroxybenzaldehyde was dissolved in 18 ml. of methanol by warming. When cool, 4.0 ml. of 25% sodium methoxide in methanol was added. After 24 hours the reaction mixture was diluted with 100 ml. of water containing 1 ml. of glacial acetic acid. Upon standing 48 hours, the gummy product, 2.4 g. of p-(5-[m-hydroxyphenyl]penta-4-ene-3-one)indole was separated.

In the same manner using other aromatic aldehyde as the reactant, corresponding β-(5-[substituted aryl]penta-4-ene-3-one)indoles are prepared.

It is to be understood that it is intended to cover all changes and modifications of the examples of the invention herein chosen for the purpose of illustration which do not constitute departures from the spirit and scope of the invention.

This application is a continuation-in-part of our co-pending application Serial No. 727,263, filed April 9, 1958, and now abandoned.

We claim:

1. A compound of the formula

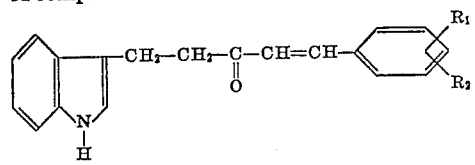

wherein $R_1$ is selected from the group consisting of hydrogen, methoxy, hydroxy, chloro and acetamido, and $R_2$ is selected from the group consisting of hydrogen and methoxy, and those structures wherein $R_1$ plus $R_2$ is methylenedioxy.

2. The compound

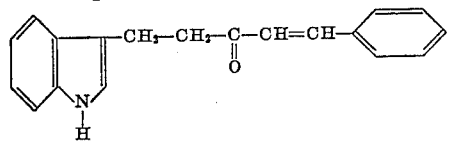

3. The compound

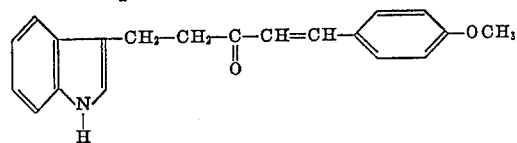

4. The compound

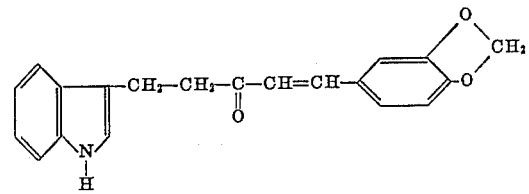

5. The compound

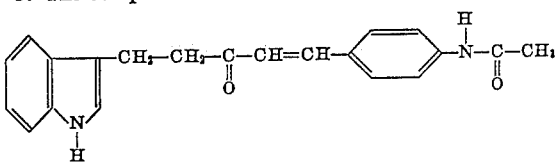

6. The compound

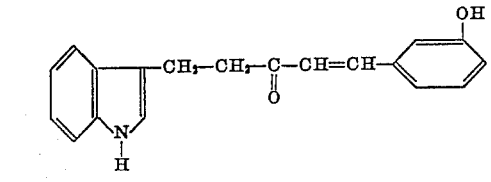

References Cited in the file of this patent

Harries et al.: Ber. d. Deut. Chem. Ges., vol. 35, pages 966 to 971 (1902).

Beilstein's Handbuch der Organischen Chemie, vol. 21, 4th ed., page 356 (System #3189), Berlin, 1935.

Metayer et al.: Comptes Rendus, vol. 226, pages 1095 to 1097 (1948).

654 O.G., pages 1152 to 1154, Jan. 22, 1952.